US012534031B1

(12) United States Patent
Benjauthrit et al.

(10) Patent No.: US 12,534,031 B1
(45) Date of Patent: Jan. 27, 2026

(54) SITTING SHOWER STALLS AND A METHOD OF OPERATION

(71) Applicants: Boonsieng Benjauthrit, La Canada, CA (US); Kanokraj Y. J. Benjauthrit, La Canada, CA (US); Vatcharee Y. L. Benjauthrit, La Canada, CA (US)

(72) Inventors: Boonsieng Benjauthrit, La Canada, CA (US); Kanokraj Y. J. Benjauthrit, La Canada, CA (US); Vatcharee Y. L. Benjauthrit, La Canada, CA (US)

( * ) Notice: Subject to any disclaimer, the term of this patent is extended or adjusted under 35 U.S.C. 154(b) by 0 days.

(21) Appl. No.: 17/846,065

(22) Filed: Jun. 22, 2022

(51) Int. Cl.
*B60R 15/02* (2006.01)
*A47K 3/12* (2006.01)
*A47K 3/28* (2006.01)

(52) U.S. Cl.
CPC .............. *B60R 15/02* (2013.01); *A47K 3/122* (2013.01); *A47K 3/284* (2013.01)

(58) Field of Classification Search
CPC ...... A61G 7/0005; A45D 19/04; A45D 19/06; A45D 19/08; A45D 19/10; A45D 19/12; B60R 15/02; B60R 15/04; A47K 3/248; A47K 3/286; A47K 3/325; A47K 3/32
See application file for complete search history.

(56) References Cited

U.S. PATENT DOCUMENTS

| | | | | |
|---|---|---|---|---|
| 2,457,190 | A | 12/1948 | Werner | |
| 2,544,092 | A * | 3/1951 | Karlson | A47K 3/325<br>312/306 |
| 2,852,784 | A * | 9/1958 | Winkler | A47K 3/325<br>4/599 |
| 3,629,875 | A * | 12/1971 | Dow | A47K 3/325<br>D25/19 |
| 3,646,618 | A * | 3/1972 | Johnson | A47K 3/325<br>D25/16 |
| 3,940,806 | A | 3/1976 | Mustee | |
| 4,807,310 | A * | 2/1989 | Sedala | A47K 3/32<br>4/612 |
| 5,303,519 | A | 4/1994 | Mustee et al. | |
| 5,544,369 | A * | 8/1996 | Roberts | E04H 1/1277<br>4/603 |
| 6,003,169 | A | 12/1999 | Davis | |
| D682,401 | S | 5/2013 | Mustee | |
| D694,377 | S | 11/2013 | Mustee | |
| 10,863,870 | B2 * | 12/2020 | Hart | A47K 3/32 |

* cited by examiner

*Primary Examiner* — Erin Deery
(74) *Attorney, Agent, or Firm* — Michael D. Eisenberg

(57) ABSTRACT

The invention includes a low profile shower stall that can be installed in low profile minivans, vans, and other recreational vehicles. It also provides a mean to deliver water both in a container or from a tank less water heater. The user can take a hot shower comfortably by sitting on a seat. It can also be used as a portable bathtub. It can be made as a single unit enclosure by plastic injection molding or by 3D printing or other similar technologies. This low profile shower stall can also be installed in hostels, motels, or dwellings that need low profile.

11 Claims, 7 Drawing Sheets

SITTING SHOWER STALLS AND A METHOD OF OPERATION

FIELD OF THE INVENTION

The present invention relates to shower stalls, bath tubs and hot shower with low profile in particular.

BACKGROUND OF THE INVENTION

As COVID-19 (Coronavirus disease of 2019) becomes a pandemic, people start to be afraid to stay in motels and hotels when they travel. Minivans and other vans have become a popular mean to travel because they are large and as economical as sedans. So people have turned these vehicles into recreational vehicles (RVs) by packing a bed, a mini kitchen, and drawers. One impediment in this type of vehicular travel is taking a bath as they travel for days. Going to restrooms and toilets is usually not a problem. They can be found in rest areas and any market or restaurant. But taking a shower is a hassle and often costly. Some truck rest areas may charge some significant amount of money for a short shower. To put a mini shower stall in this type of vehicle is almost impossible. Most minivans and regular vans are of low profile. That is, their height is rather low in the order of 3 to 5 feet in height. So one way to do it is to extend the rooftop, which can be costly and usually unsightly. This is a major drawback in this type of vehicular travel. There is a need for a mean to conveniently clean up oneself while traveling with these types of vehicles. This is also true for a case of outdoor camping.

SUMMARY OF THE INVENTION

The invention includes a low profile shower stall with an entrance and a mean to prevent water to come out, a water resistant base like a tub with a slant floor where gray water can flow down, a drain hole with a plug, a seat, and a shower head and a shower head holder that can be installed in a low profile space like behind a minivan or regular van and can be used to take a cold or hot shower by sitting on a seat with comfort. Cold showers can be from tap water or from a water container. Hot showers can be from tap water or a Hot Shower Anywhere kit, which comprises of a tank-less water heater, a pump, a propane gas tank, a water container and a gray water container, and a car battery or a separate battery. Other features of regular shower stalls like soap and towel holders can be included. The invention can also be made as a one unit plastic enclosure made by mold injection, where the bottom of the seat and the slant floor can be used as fresh water storage area, which can be as large as 25 gallons or more. Gray water can be drained into a drain hole located at the bottom of the vehicle.

Advantages of this invention are discussed. Installation and a method of operation of the invention are also provided.

The invention can also be installed in a low profile dwelling like an apartment, hostel, and a motel.

DETAILED DESCRIPTION OF THE INVENTION

Figure 1A:
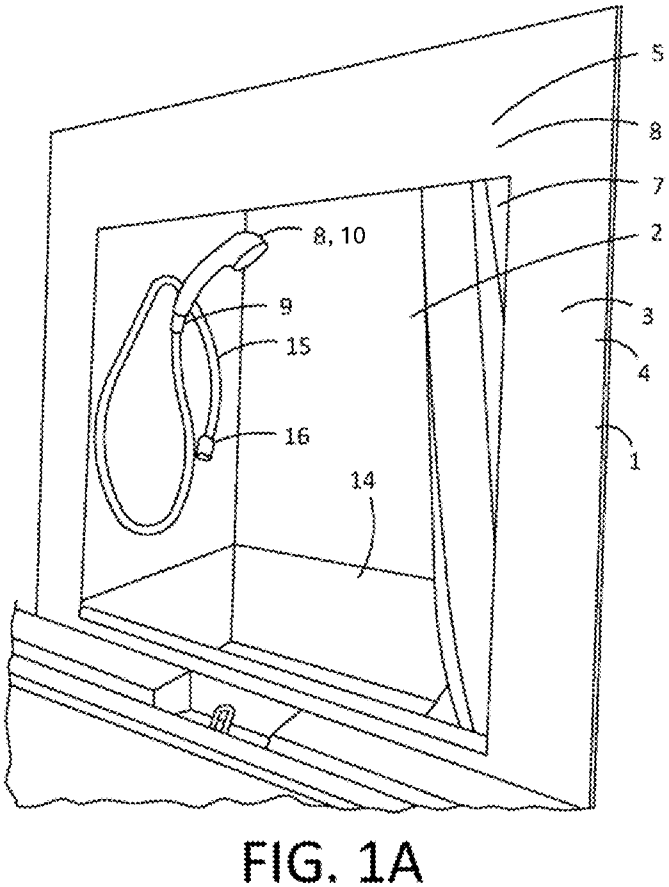
FIG. 1A is a front view of a Sitting Shower Stall.

Parts are Given Below.

1. Sitting shower stall
2. Front opening
3. Walls
4. Enclosure walls
5. Curtain rod
6. Hanger rings
7. Curtain
8. Shower head
9. Shower head holder
10. Water turn on-off valve
11. Drain hole
12. Drain hose
13. Elevated plate
14. Vinyl or plastic sheeting
15. Shower hose
16. Shower hose connector
17. Hot shower anywhere
18. Tank-less water heater
19. Top cover
20. Side walls
21. Gas hose
22. Propane gas tank
23. Gas hose connector
24. Gas valve (min-max)
25. Water valve (min-max)
26. Water hose
27. Pump motor
28. Hose holder tube
29. Inlet water hose
30. Outlet water hose
31. Shower head
32. Shower head on-off valve
33. Shower water bucket
34. Gray water bucket
35. 12-volt battery
36. Cigarette female connector
37. Cigarette male connector
38. Electrical wires
39. Propane gas valve
40. Left door
41. Right door
42. Hose Y connector
43. Input side of the hose Y connector
44. Output side 1 of the hose Y connector
45. Shut off valve 1

Figure 1B:
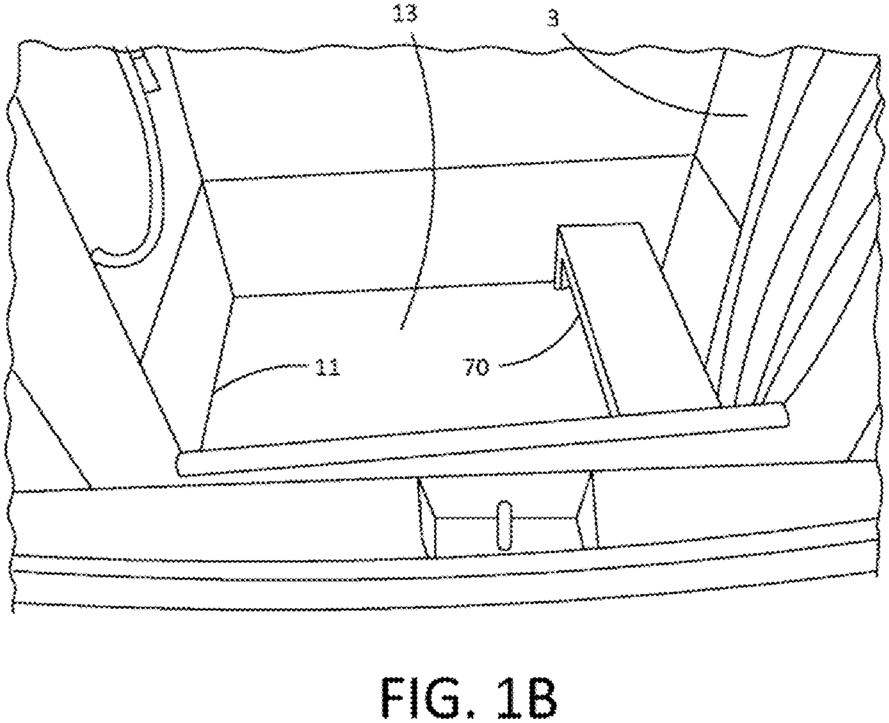
FIG. 1B is a front view of a Sitting Shower Stall, showing a drain hole and a stool.
Figure 1C:
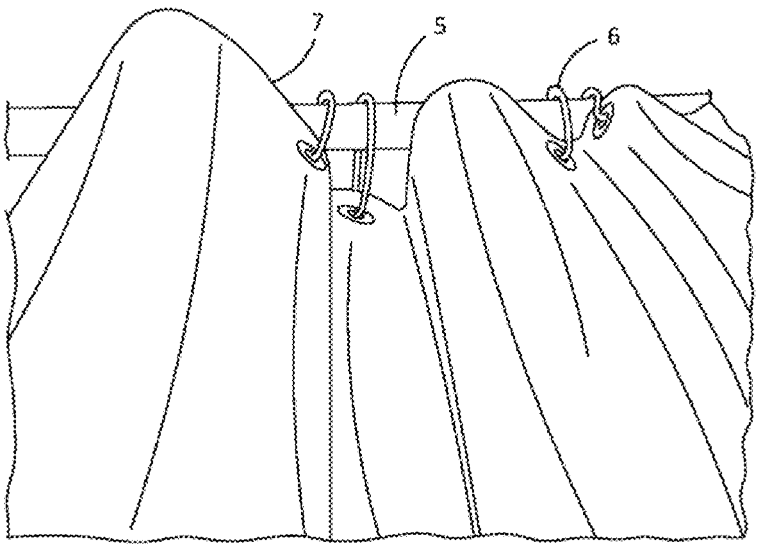
FIG. 1C is an inside view of a Sitting Shower Stall, showing a curtain, a holding rod, and hanging rings.
Figure 5A:
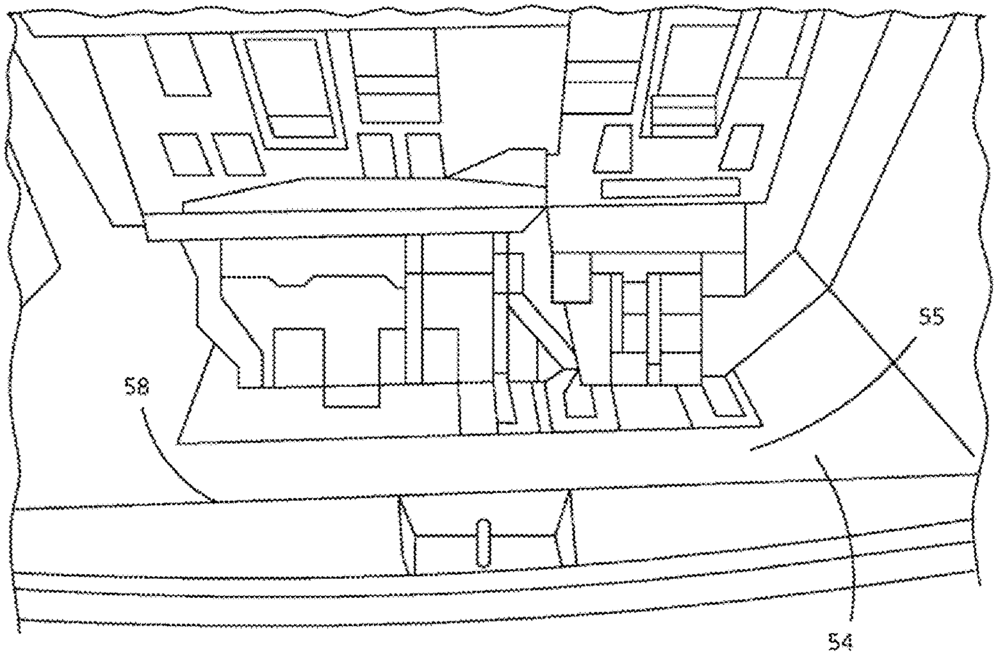
FIG. 5A is a photograph of a minivan trunk.
Figure 5B:
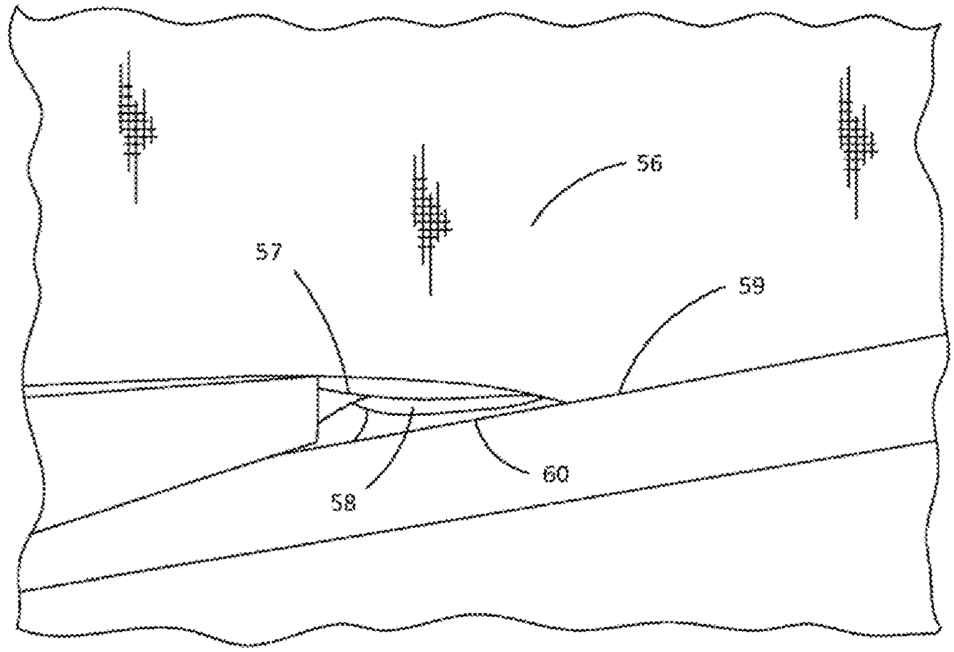
FIG. 5B is a photograph of a minivan seat well where carpet, pad and drain hole are located.
Figure 5C:
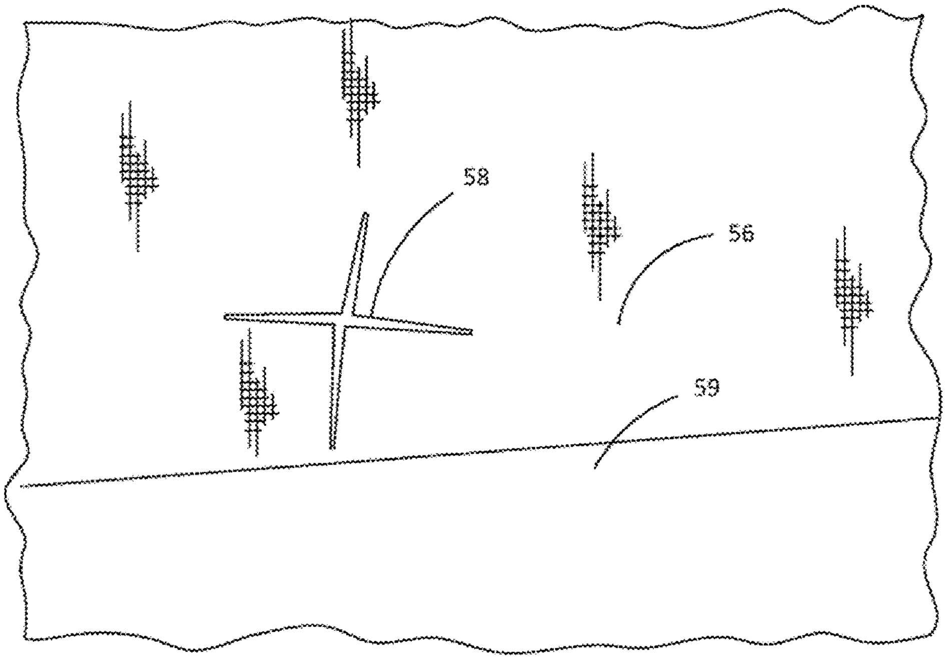
FIG. 5C is a photograph of a cross cut of carpet where drain hole is located.
Figure 5D:
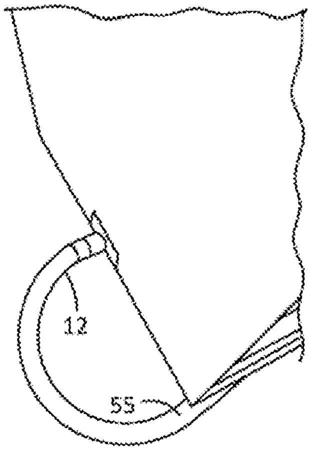
FIG. 5D is a photograph of a drain hose.

46. Output side 2 of the hose Y connector
47. Shutoff valve 2
48. Another water hose
49.
50. Switch
51. Shower head
52. Faucet
53. Handle (on a valve)
54. Minivan trunk
55. Minivan seat well
56. Carpet
57. Foam pad
58. Drain hole
59. Plastic panel
60. 1½" Floor drain
61. 1½" Flat rubber O-ring
62. 1½" Flat paper O-ring
63. 1½" nut
64. Metal round plate
65. Flat round rubber washer
66. Mud prevention cover
67. 2" diameter cutout hole
68. Razor blade cutter
69. Floor drain installation tool
70. Stool
71.
72. Cap
73. A mold injected sitting shower stall
74. Water fill hole with cap
75. Entrance door
76. Slanted floor
77. Seating area
78. Water tank
79. Tap water hookup
80. Pump hookup
81. Shower head holder
82. Drain, cap and hose With reference to FIG. 1, an embodiment of the invention is a sitting shower stall 1, which is an enclosure with six walls 4 with one front wall partially open 2 for entrance and exit and edges 3 to prevent shower water to come out. One main feature of this sitting shower stall is a low profile (less than 4 feet, for example), a medium width (3 feet or less), and a shallow depth (less than 2 feet), so it would fit in a tight space like in a trunk bed of a minivan. A nominal size is 42" high, 36" wide, and 22" deep. This would fit snugly in a Toyota Sienna 8-passenger minivan without the back window glass hitting the shower stall. One side of the bottom of the floor of the sitting shower stall 1 is elevated (at least ¼ " per each foot) with a plate 13 where a drain hole 11 is located opposite so shower water can drain out through a drain hose 12 (FIG. 5D). If the sitting shower stall 1 is made of non-water resistant material, the bottom portion of the floor would be coated or covered with water resistant material 14 such as vinyl or plastic like ABS material and caulked with water resistant sealant like silicone. Another embodiment of this sitting shower stall is a shower curtain 7 covering the open space hanging with hanging rings 6 on a curtain rod 5, which would be stretched against the two walls, as shown in FIG. 1C. Another embodiment is a shower head 8 with a turn on-off valve 10, which rest on a shower head holder 9. The shower head 8 is attached to a shower hose 15 having a shower hose connector 16, as shown in FIG. 1A.

Figure 2A:
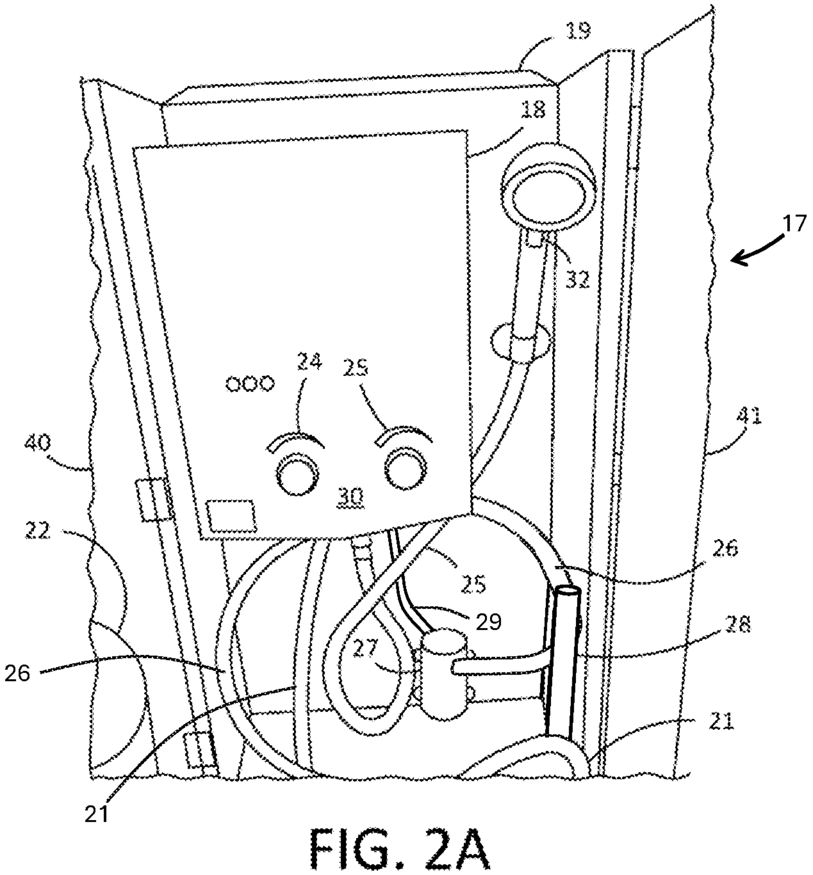
FIG. 2A is a detailed Hot Shower Anywhere.
Figure 3:
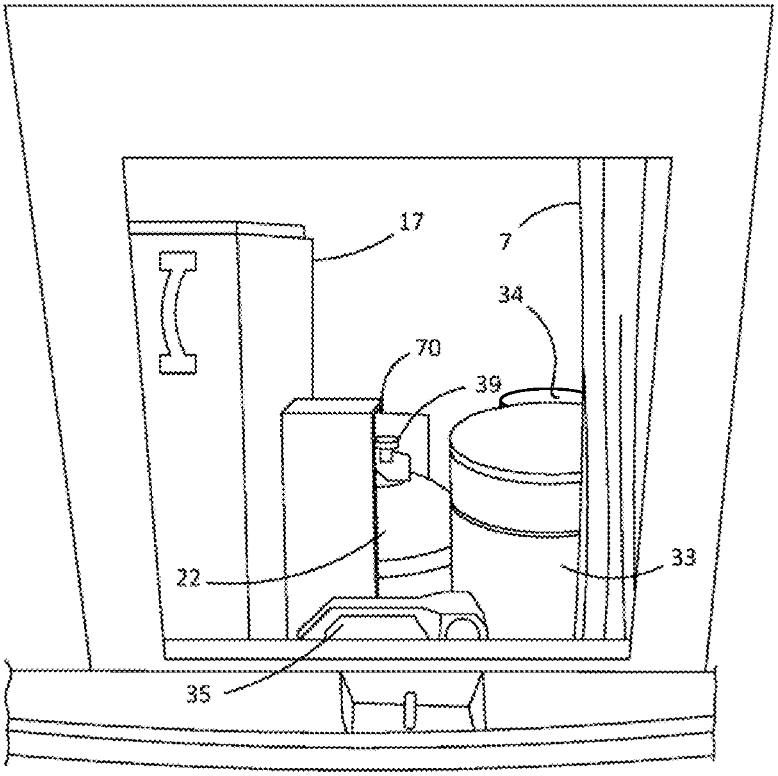
FIG. 3 is a packed Sitting Shower Stall.
Figure 4:
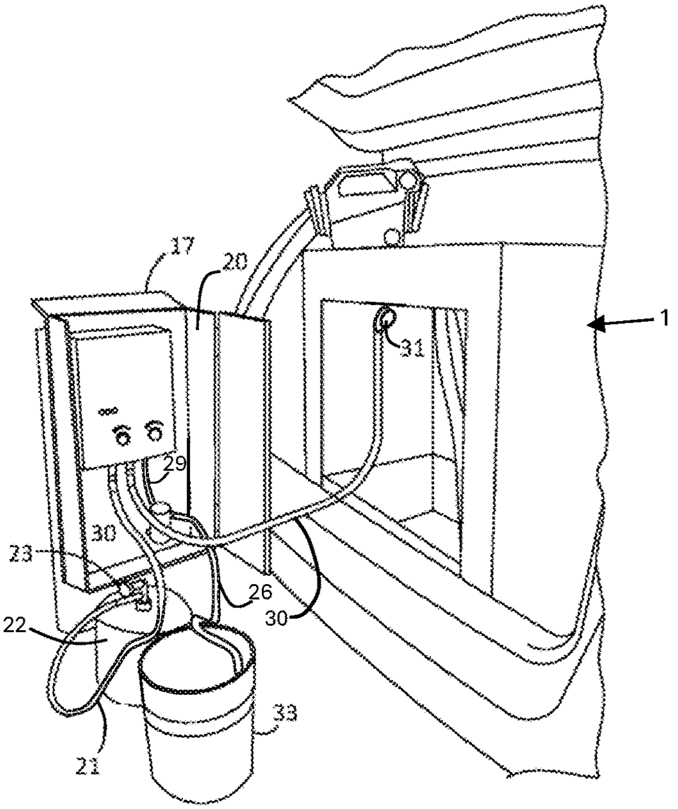
FIG. 4 is a Sitting Shower Stall in use.

With reference to FIG. 2A, FIG. 3, and FIG. 4; another embodiment of the invention is a Hot Shower Anytime 17, which consists of a tank-less hot water heater 18, a water pump motor 27, a water container 33, a propane gas tank 22, and a gray water container 34. The tank-less water heater 18 is connected to the propane gas tank 22 with a gas hose 21 with a connector 23. The propane gas tank 22 is turned on with a valve 39. The inlet of the water pump motor 27 from the water container 33 is through a water hose 26, which is held in place by a tube 28. The outlet of the water pump motor 27 is connected to the inlet of the tank-less water heater 18 via a water hose 29. The outlet of the tank-less water heater 18 is connected to a shower head 31, which has a turn on-off valve 32, via a shower head hose 30. The tank-less water heater 18 has gas control valve (min-max) 24 and water control valve (min-max) 25. The Hot Shower Anywhere 17 has a top cover 19 that can be open when it is operated. It also has two doors 40 and 41 that can be closed when not in use. The water pump motor 27 is operated by a 12-volt battery 35 via electrical wires 38 and a male cigarette plug 37 that can be plugged into a female cigarette lighter plug 36. The tank-less water heater 18 is operated using propane gas from propane gas tank 22 via a gas hose 21.

Still another embodiment of this invention is a seat 42 provided in the Sitting Shower Stall 1, which the user can sit while taking a shower. This way the user will not be soaked in the gray water as in the case of a tub shower while cleaning his or her body parts.

Still another embodiment of this invention is a feature where water container or water from public water tap or house can be hooked up to the shower head inside the Sitting Shower Stall 1.

Still further another embodiment of this invention is a dual shower head or a moveable (up and down) shower head which can be relocated to a lower position in a standard shower head and a seat so the user can sit to take a sitting shower.

Figure 7:
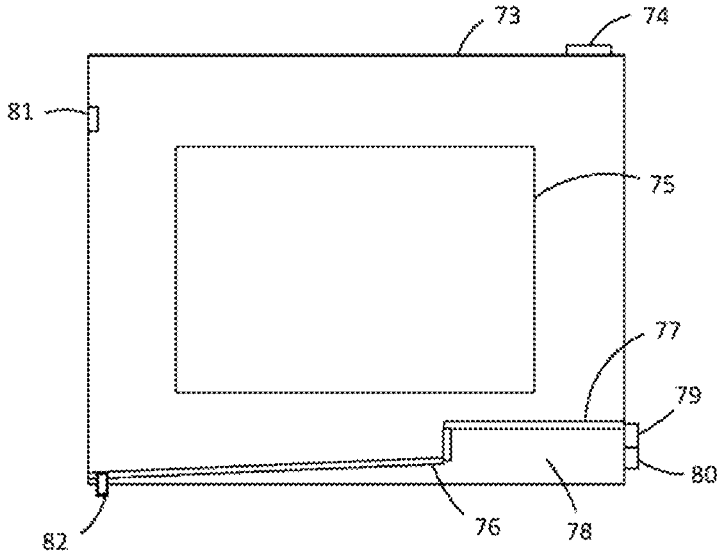
FIG. 7 is a drawing of a 2-dimension mold injected plastic sitting shower stall.

Still further another embodiment of this invention is a plastic mold injection model 73 as shown in two dimensions as illustrated in FIG. 7. As one unit, the enclosure 73 contains an opening 75 for entry with a mean to prevent water to come out like a shower curtain or a cloth door with a zipper, a slant floor 76 for water to drain down, a drain 82 with a cap and a hose to direct water into a drain of a vehicle, a built in seat 77 where the user can sit on, under which can be used as a clean water storage tank 78, a water refill hole 74 with a cap, a tap water connector 79, a pump hookup 80, and a shower head holder 81. Other features can be added as needed. With a seat of 12" high, 12" wide and 21" deep, the shower stall can easily hold 13 gallons of fresh water (12×12×21/231). The capacity can be increased to 25 gallons if the volume the slant area with the height at the end of 2 feet of 1 inch is also included.

Figure 8:
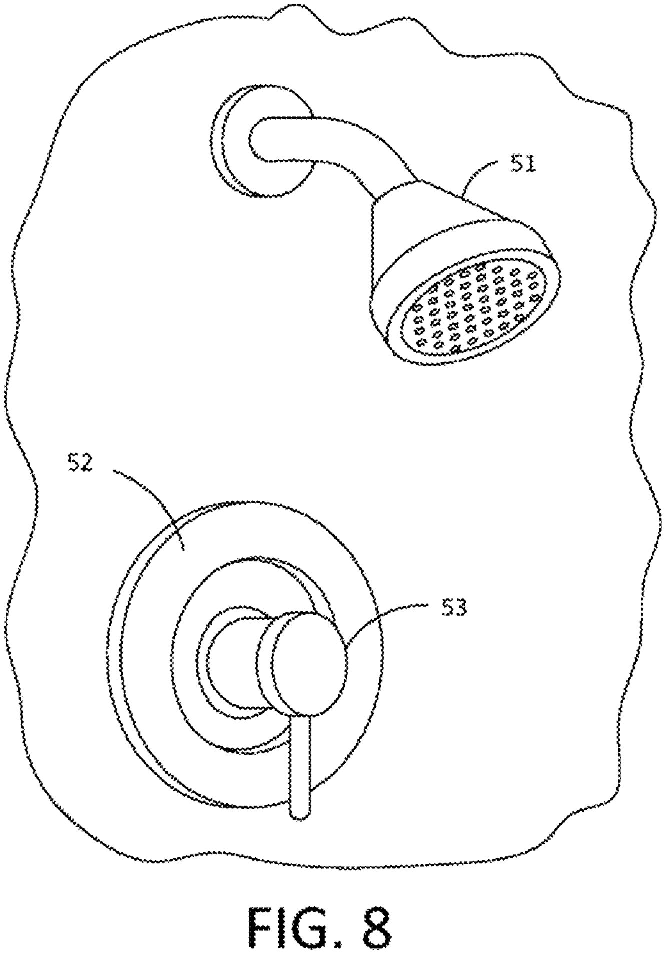
FIG. 8 is a photograph of a mold injected plastic sitting shower stall with a convention shower head and a faucet (with a valve) installed.

FIG. 8 illustrates a further embodiment of the invention with a conventional shower head and a faucet (with a valve) installed.

Advantages of sitting shower stall over a standard standing shower are discussed below.

1. It can often be safer. One can slip and fall while standing, especially during the soaping process.
2. It can be cleaner. Cleaning the lower parts of the body while standing is often skimpy or hardly achieved. One has to stoop down to scrub the feet and foot fingers, which are often difficult, especially for older people. Cleaning the lower parts of the body is fairly easy and convenient in the sitting position, so the users are more comfortable and can enjoy the activities.
3. It can be healthier. With a seat in sitting shower stall, the lower parts of the body will have much less chance to come in contact with gray water after cleaning. For those who still want to soak in water can still do so with much cleaner water after draining out gray water.

4. In a sitting position, the user can enjoy taking the shower more without feeling tired.

Operational Procedure

In a method according to the invention, the Sitting Shower Stall 1 can be carried out as follows. We shall assume that the rear seats of the minivan to be used in this operation are already positioned in the upright position. If they are not, follow the directions in the minivan manual on how to set them up.

Figure 2B:
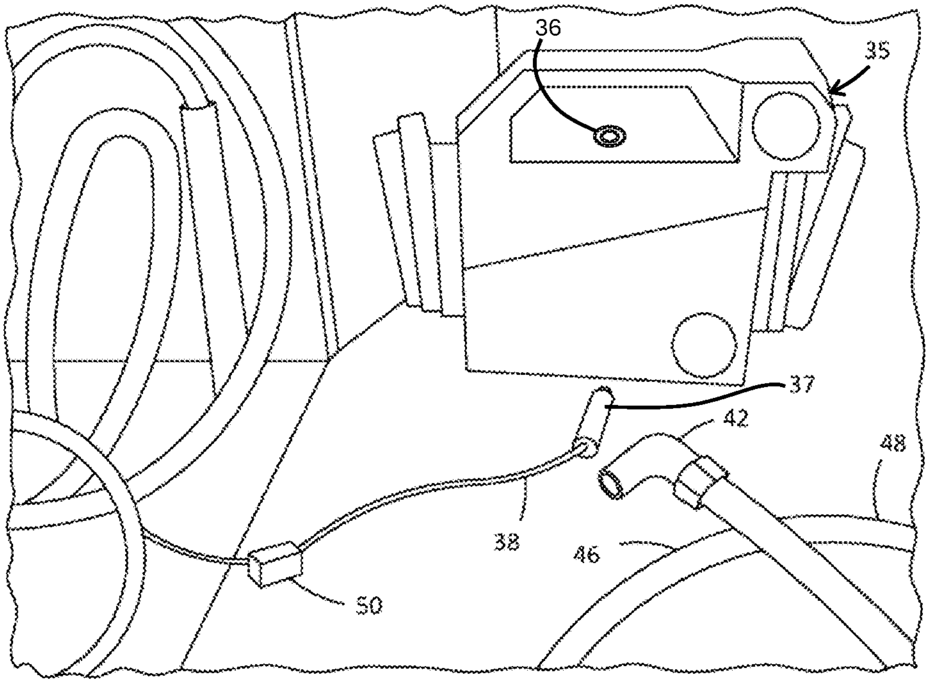
FIG. 2B is more details on Hot Shower Anywhere.
Figure 6:
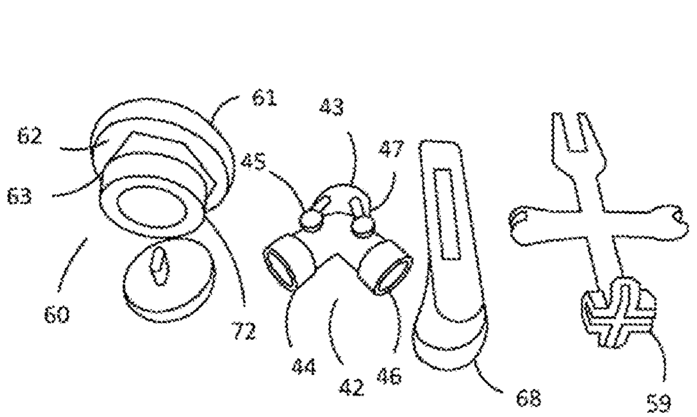
FIG. 6 is a photograph of a floor drain with parts, a hose y connector and tools.

1. Place the Sitting Shower Stall 18 into the minivan seat well 55 in the minivan trunk 54, as shown in FIG. 5A.
2. Insert the drain hose 12 into the hole of the floor drain 60 (see floor drain installation instruction below).
3. Fill water into the water bucket 33 (FIG. 5D).
4. Place the inlet water hose 26 into the tube 28 and place them into the water bucket 33 as shown in FIG. 4.
5. Connect the tank-less water heater water outlet hose to the input side 43 of the hose Y connector 42, as shown in FIG. 6.
6. Connect the hose 30 of the shower head 31 to the output side 44 of the Y connector 42 and another water hose 48 to the other output side 46 of the Y connector 42. Place the water hose 48 into the water bucket 33 as shown in FIG. 4 and FIG. 6. Turn off valve 45 and turn on valve 47.
7. Connect propane gas hose 21 from the tank-less water heater 18 to the propane gas tank 22. Turn propane gas valve 24 to max and water valve 25 to max (see FIG. 2A).
8. Turn off switch 50 (FIG. 2B). Plug male cigarette lighter plug 38 from the water plump motor 27 into the female cigarette lighter receptacle 36 of the 12-volt battery 35.
9. Turn propane gas valve 39 to on (clockwise fully).
10. Turn on switch 50. After a few minutes, the tank-less water heater burner will start up to heat water passing through. Check the water in the water bucket for a desirable temperature. Then turn of the switch 50 and shut off propane gas valve 39.
11. The sitting shower stall is ready to be used now.
12. Place the gray water bucket underneath the drain and open the drain cap.
13. The sitting shower stall can be used for shower by unplug the drain.
14. After finishing the shower, if the user wants to soak in water he/she can screw in the plug so water can retain inside the tub.
15. After finishing soaking, unplug the drain, allowing gray water to drain out.
16. Replace the drain cap.

Installation of a Minivan Floor Drain

Most of minivans or regular vans would have a 1½" pre-drilled drain hole available at the bottom of their trunk bed. Instructions given below are referenced to FIG. 5.

Figure 5E:
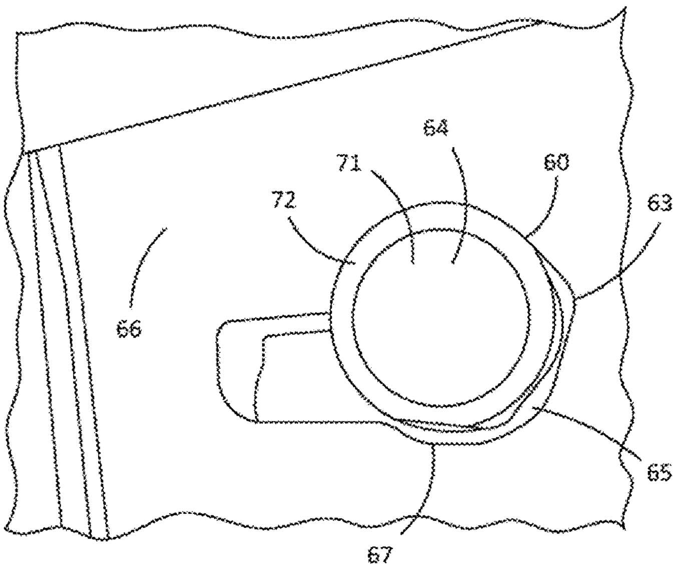
FIG. 5E is a photograph of a drain with a cap on under a mud prevention cover.

1. Carefully lift the floor carpet 56 and foam pad 57 from plastic panel 59 of a minivan as shown in FIG. 5A.
2. Slowly insert a 1½" floor drain 60 with a 1½" flat rubber O-ring inserted into the floor drain hole 58 and turn it clock-wise until the threads of the floor drain engages to the floor drain hole metal. Continue turn the floor drain as far as possible.
3. Cut a 2" in diameter hole 67 in the plastic mud prevention cover 66 with a razor blade cutter 68.
4. Use a floor drain installation tool 69 to turn the floor drain 60 until it is all the way down.
5. Insert a 1½" flat paper O-ring 62 and screw in a 1½" locknut 62 using a crescent wrench until the locknut is snugly tight.
6. Install a 1½" nut 63 with a metal round plate 64 and flat round rubber washer 65 inserted.
7. Using the razor blade cutter 68 to make a + cut into the carpet 56 and foam pad 57 directly above the drain hole 66 with the width of about 2" on each side as shown in FIG. 5C.
8. If desired, a 1½" drain pipe nipple can be installed at location 71 (FIG. 5E).

Even though the present invention has been described with respect to one or more particular embodiments, it will be understood that other embodiments of the present invention may be claimed without departing from the spirit and scope of the present invention. Therefore, the present invention is deemed limited only by the appended claims and the reasonable interpretation thereof.

What is claimed is:

1. A sitting shower stall sized to fit in the back of a minivan, the shower stall comprising:

four vertical walls, one of the walls being a front wall having an opening for entry and exit of a user therethrough;

a floor;

a slanted floor plate located above the floor, the floor plate having a drain hole at or adjacent to a lowest location thereof, the drain hole being configured to be connected to a drain hose for draining water from shower stall, wherein a space between the floor and the slanted floor plate is configured to store clean water;

a tap water connector for receiving tap water into the space between the floor and the slanted floor plate;

a pump hookup configured to connect to a pump for pumping the clean water out of the space between the floor and the slanted floor plate and into a shower head associated with the shower stall.

2. The shower stall of claim 1, further comprising:

a curtain rod extending between two of the vertical walls adjacent to the front wall;

a curtain hanging from the curtain rod to cover the opening on the front wall.

3. The shower stall of claim 1, comprising a stool for supporting a sitting user while the user in the shower stall.

4. The shower stall of claim 3, wherein the stool is integral with the floor plate and located at an end of the floor plate which is farthest from the drain hole.

5. The shower stall of claim 1, further comprising a shower head with a turn on-off valve and a shower hose.

6. The shower stall of claim 1, wherein the floor plate is anti-slip.

7. The shower stall of claim 1, wherein the four vertical walls, the floor, and the slanted floor plate are integral with each other to form a single unit made from a single material.

8. The shower stall of claim 7, wherein the shower stall is made as a unitary object via injection molding or three-dimensional printing.

9. The shower stall of claim 1, further comprising a water refill hole with a cap.

10. The shower stall of claim 1, further comprising a shower head holder.

11. The shower stall of claim 1, further comprising a ceiling.

* * * * *